United States Patent [19]

Ayoul

[11] Patent Number: 4,662,319
[45] Date of Patent: May 5, 1987

[54] STRUCTURALLY LIGHTENED PISTON UTILIZABLE ESPECIALLY IN AN INTERNAL COMBUSTION ENGINE

[75] Inventor: Philippe Ayoul, Neuilly sur Marne, France

[73] Assignee: S.E.M.T., S.A., Saint Denis, France

[21] Appl. No.: 805,812

[22] Filed: Dec. 6, 1985

[30] Foreign Application Priority Data

Dec. 20, 1984 [FR] France .................. 84 19533

[51] Int. Cl.⁴ ............................................... F01P 3/10
[52] U.S. Cl. ............................. 123/41.35; 123/41.37; 123/41.38; 123/193 P; 92/186
[58] Field of Search ............. 123/41.37, 41.38, 41.34, 123/41.35, 193 P; 92/186, 157, 158, 159, 208, 239

[56] References Cited

U.S. PATENT DOCUMENTS

| | | | |
|---|---|---|---|
| 1,856,107 | 5/1932 | Mellor | 123/41.38 |
| 2,687,931 | 8/1954 | Flynn, Jr. | 123/41.38 |
| 3,930,472 | 1/1976 | Athenstaedt | 123/41.38 |
| 4,253,430 | 3/1981 | Garten et al. | 123/41.38 |
| 4,270,494 | 6/1981 | Garten et al. | 123/41.38 |
| 4,363,293 | 12/1982 | Munoz et al. | 123/41.37 |

FOREIGN PATENT DOCUMENTS

| | | |
|---|---|---|
| 1081289 | 5/1960 | Fed. Rep. of Germany . |
| 675593 | 2/1930 | France . |
| 2381181 | 9/1978 | France . |
| 2388140 | 11/1978 | France . |

*Primary Examiner*—Ira S. Lazarus
*Attorney, Agent, or Firm*—Kenyon & Kenyon

[57] ABSTRACT

The piston for an internal combustion engine, consisting of a piston head (1) and a body (2) of monobloc or two-piece construction, the head bearing upon the body (2) via at least two circular bearing surfaces (4, 5), the body (2) having a bearing part (6) receiving an articulation part (10) rigidly attached to the end of a connecting rod (3) and said bearing part (6) having on its piston head side a wall (7) forming a bearing whose bearing surface (8) is continuous, is structurally lighter in that the portion of its body (2) connecting the wall (7) to the bearing surfaces (4, 5) is formed of at least two thin, truncated conical partitions (11, 12) whose center lines (13, 14, 15, 16) are rectilinear, each of said partitions bearing upon a separate one of the circular bearing surfaces (4, 5).

5 Claims, 3 Drawing Figures

STRUCTURALLY LIGHTENED PISTON UTILIZABLE ESPECIALLY IN AN INTERNAL COMBUSTION ENGINE

This invention concerns a piston, especially one for an internal combustion engine, consisting of a head and a body of either monobloc, ie. integral, construction or two-part construction, having a bearing to receive an articulation part, such as a pin or ball, rigidly mounted on the end of a connecting rod.

The body of such pistons is commonly made of a light alloy and when combustion pressures reach very high values, of say 200 bar or more, stresses in the wall of the bearing part become greater than the light alloy can withstand.

Accordingly, it is necessary to use a more resistant (higher strength) material for the piston body, such as cast iron for example. Assuming the same structure is maintained for the body, the weight becomes prohibitive and the thermal stresses excessive.

It is possible in a known way to provide a first improvement consisting in adjoining a separate guiding skirt to the piston, distinct from the body. By making the skirt of a different material from that of the body, it is possible to give the skirt specific characteristics such as a low friction coefficient and lighter weight. This will improve the piston's mechanical characteristics, but will not achieve the light weight of a piston body made entirely of light alloy.

Another prior art improvement, described in Document DE 1,081,289, involves a piston consisting of a head extending into an integral skirt and of a monobloc body having a bearing to receive an articulation part rigidly attached to the end of a connecting rod, the latter bearing comprising, on the piston head side, a wall forming a bearing with a continuous bearing surface. The body comprises an element for transmitting and distributing mechanical stresses from the head to the piston pin, said element being a single thin wall which is circular at the level of the head's bearing and flattened at the level of the articulation pin. A single wall or partition having such a structure cannot withstand high combustion pressures because the head is insufficiently balanced geometrically. Besides, the ribs designed to stiffen the pin journaling portion are subjected to great stresses and the body is not configured to receive a separate skirt of a lighter material.

It is the object of the present invention to provide a piston made from a strong material, for instance cast iron, capable of withstanding very high combustion pressures, yet having substantially the same weight as a light alloy piston. This object is attained by means of a careful design of the structure of the piston body, enabling the body to be lightened and the stress-induced deformations of the bearing part to be limited, thus evening the unit pressures between the bearing and the articulation part.

The piston according to the invention has a head bearing upon the body via at least two concentric circular bearing surfaces, the portion of the body which connects the wall of the bearing for the articulation part to the bearing surfaces being formed of at least two thin partitions having a basically truncated cone shape and straight center lines, each of said partitions bearing on a separate bearing surface.

Preferably, the piston according to the invention further exhibits one of the following design characteristics:

for any given axial cross section of the piston, the points of intersection of the center lines of the partitions are located on the articulation part side of the wall bearing, the intersections of the partition center lines with the wall bearing determine successive segments and/or arcs of a curve, the ratio of the length of the shortest thereof to the length of the longest thereof being greater than or equal to 1:10, it comprises an annular partition linking together the piston body bearing surfaces, said partition defining on the one hand, in conjunction with the truncated cone-shaped walls and the bearing wall, an annular chamber, and on the other hand, in conjunction with the piston head, another annular chamber, said annular chambers being part of the cooling system for the piston and communicating with one another via suitable orifices for coolant flow purposes.

The invention will be more readily understood in reading the following description of the preferred embodiment, with reference to the appended drawings in which.

Figure 2:
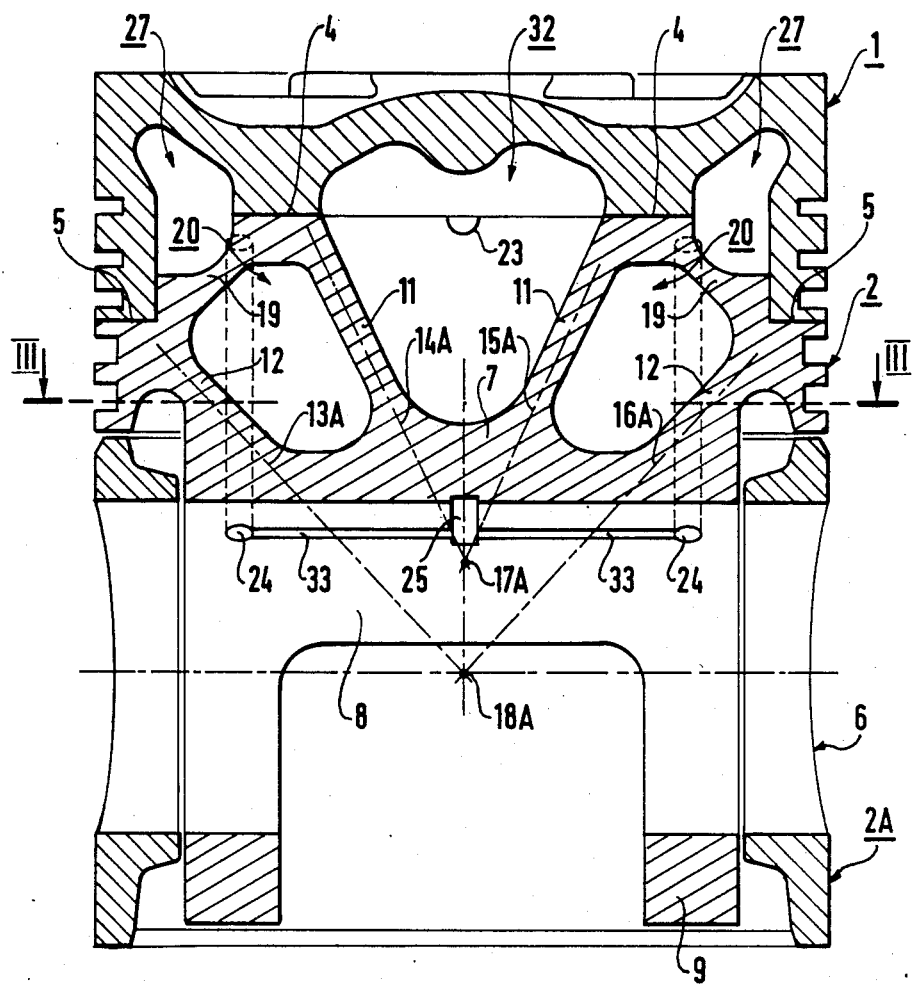
FIG. 2 is a sectional view taken along the centerline II of FIG. 1, in which the connecting rod and the articulation pin have been omitted.
Figure 3:
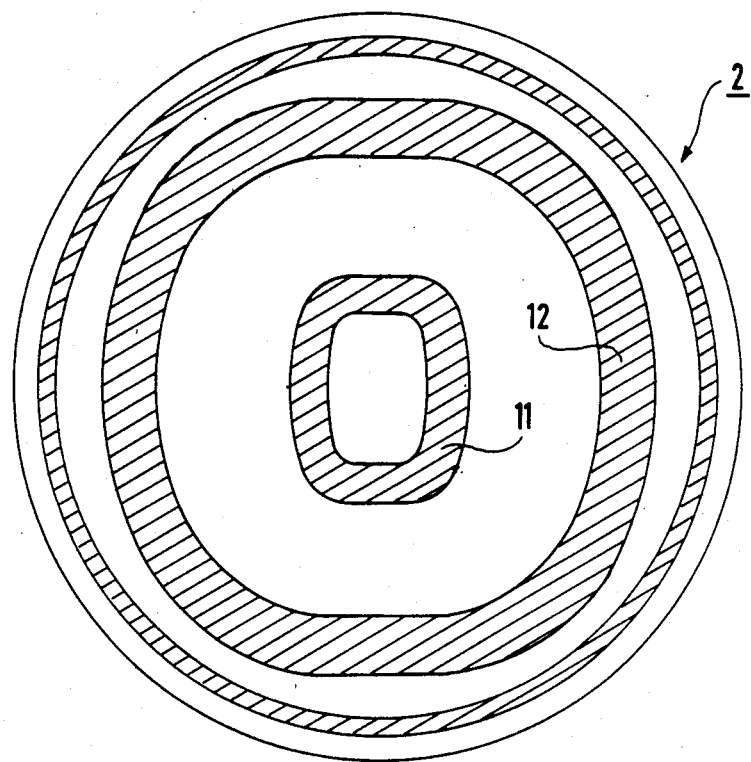

and FIG. 3 is a top view of a cross section taken along line III—III of FIG. 2.

Figure 1:
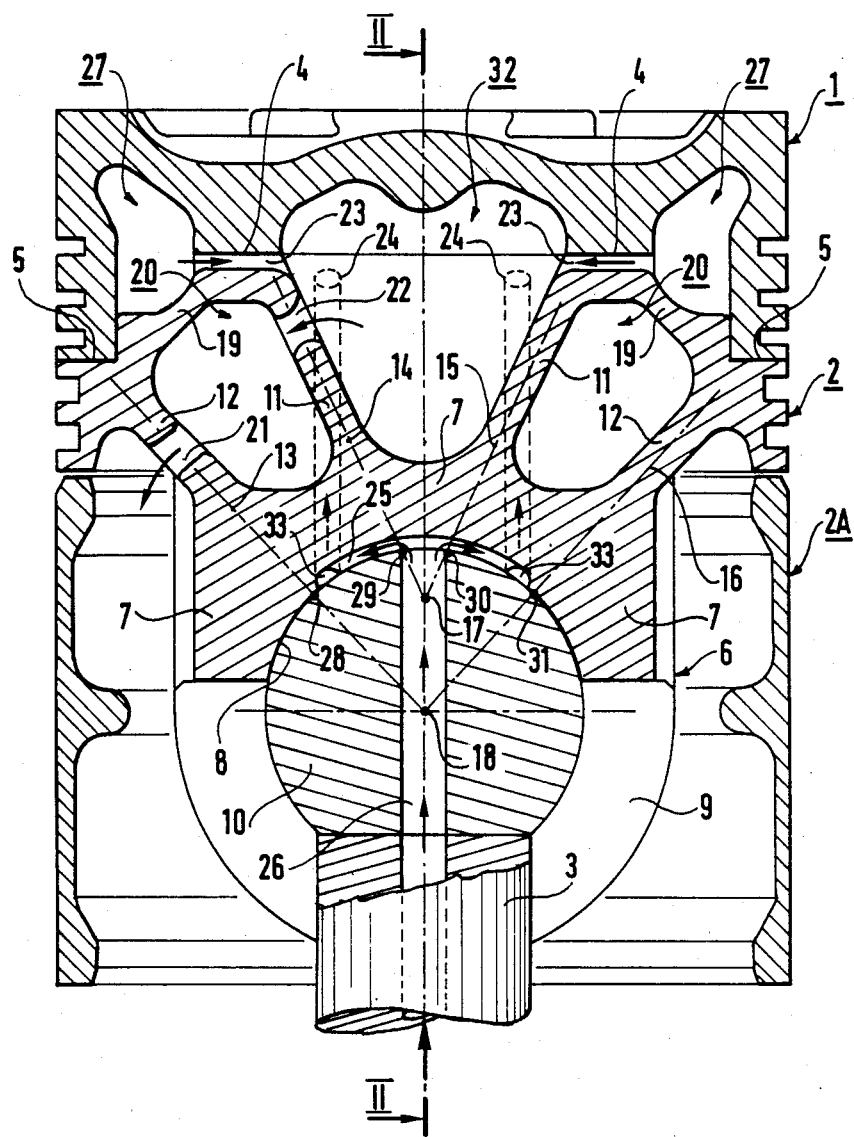
FIG. 1 is a diametral sectional view of the piston according to the invention, articulated on a connecting rod at the end of which is attached an articulation pin.

FIG. 1 shows a piston according to the invention comprising a head 1 and a body 2 articulated upon a connecting rod 3 by means of an articulation pin 10.

The head 1 bears upon the body 2 via two circular bearing surfaces 4, 5. Attaching means known per se, but not specifically illustrated, are provided between the head and the body.

In the figure under consideration the body 2 has a separate skirt 2A. However, said body and skirt could be integrally built in one piece.

The body 2 comprises a bearing 6 consisting, on the piston head side, of a wall 7 establishing a continuous half-bearing across the entire width of the body, and on the connecting rod side, of two half-bearings 9, disposed one on each side of the rod. Only one of the latter two half-bearings is shown since the figure represents a cross section. Both of them however are visible in FIG. 2. The wall 7 establishes a semi-circular bearing 8 across the entire width of the piston body, as can be seen from FIG. 2.

This bearing 6 receives the articulation pin 10 attached to the end of the connecting rod 3 by means not shown. Obviously, a bearing bush could be additionally provided between the bearing 6 and the pin 10.

The wall 7 meets each circular bearing surface 4, 5 through thin conical partitions 11, 12 of truncated aspect. The thickness and the profile or contour of these partitions are not necessarily constant and vary in different horizontal sectional planes. The cross-sectional shape of these partitions is best represented in FIG. 3.

The bearing surfaces 4, 5 are joined together by an annular partition 19. This partition 19 thus joins the tops of partitions 11 and 12 and positively contributes to the stiffness of the piston body.

Together with the other partitions 11 and 12 and wall 7, the partition 19 establishes an annular chamber 20, and together with the piston head 1 it establishes an annular chamber 27.

The oil circulation system required for lubrication and cooling consists of an inlet orifice 26 through which oil rises into the piston through the connecting rod, a groove 35 provided in the bearing part surface 8 of wall 7 or in a mechanical bearing when such is provided, two small grooves 33, most visible in FIG. 2, which are also provided in the bearing part surface 8 of wall 7, two vertical channels 24 issuing into chamber 27, a plurality of channels 23 distributed around the circumference to make chamber 27 communicate with a center chamber 32, channels 22 enabling said center chamber 32 to communicate with annular chamber 20 and, finally, channels 21 enabling annular chamber 20 to communicate with the inside of the skirt 2A and thus enabling the oil to flow back down into the crankcase.

The geometrical meeting points 17, 18 of the center lines of partitions 11 and 12, namely lines 14, 15 and 13, 16 respectively, are located on the pin side 10 of the bearing surface 8 of wall 7.

FIG. 2 shows other center lines of partitions 11 and 12, namely 14A, 15A and 13A, 16A respectively. The meeting points 17A, 18A of these center lines are located on the articulation pin 10 of the bearing surface 8 of wall 7. In general, for any diametrical cross section of the piston, in other words for any sectional plane located between the sectional planes of FIGS. 1 and 2, the meeting points between the center lines are located on the pin side of the wall 7.

The meeting points 28, 29, 30 31 of center lines 13, 14, 15, 16 with the bearing surface 8 of wall 7 determine the successive curve segments or arcs 28-29, 29-30, 30-31. The ratio of the length of the smallest segment to the length of the largest segment is not less than 1:10, and preferably these segments should have substantially the same length to best distribute the stresses on bearing surface 8, between points 28 and 31.

I claim:

1. A piston for an internal combustion engine, the piston comprising a head and a separate body having an upper end provided with at least two concentric circular radially spaced bearing surfaces and a lower end, the lower end terminating in a bearing part for receiving an articulation part rigidly mounted on the end of a connecting rod, the bearing part comprising a wall having a concave bearing surface, the head being mounted on the upper end of the body via said at least two concentric circular bearing surfaces, the body further comprising means for connecting said wall to the concentric circular bearing surfaces, said connecting means comprising at least two thin partitions having a basically inverted truncated conical shape with straight center lines, each of said partitions having a base portion bearing on a separate one of said concentric circular bearing surfaces.

2. A piston as in claim 1, wherein for any given axial cross section of the piston, the points of intersection of the center lines of the partitions are located on the articulation part side of the concave bearing surface.

3. A piston as in claim 1, wherein the intersections of the partition center lines with the concave bearing surface determine successive segments of a curve, the ratio of the length of the shortest segment to the length of the longest segment being greater than or equal to 1:10.

4. A piston as in claim 1, wherein the body further comprises an annular partition linking together the concentric circular bearing surfaces.

5. A piston according to claim 4, wherein said annular partition in conjunction with two of the truncated conical partitions and the wall of the bearing part defines a first annular chamber, and said annular partition in conjunction with the piston head defines a second annular chamber, said first and second annular chambers being part of a cooling system for the piston and communicating with one another via coolant flow orifices.

* * * * *

UNITED STATES PATENT AND TRADEMARK OFFICE
CERTIFICATE OF CORRECTION

PATENT NO. : 4,662,319

DATED : 5 May 1987

INVENTOR(S) : Philippe AYOUL

It is certified that error appears in the above-identified patent and that said Letters Patent is hereby corrected as shown below:

Col. 3, line 8: change "35" to --25--; after "bearing" delete "part".

Col. 3, line 11: after "bearing" delete "part".

Signed and Sealed this

Twentieth Day of October, 1987

Attest:

DONALD J. QUIGG

Attesting Officer

Commissioner of Patents and Trademarks